United States Patent [19]

Suzukawa et al.

[11] 4,452,637
[45] Jun. 5, 1984

[54] EXPANSIVE CEMENT ADDITIVE AND CEMENTITIOUS MATERIAL ADDED THEREWITH

[75] Inventors: Yuichi Suzukawa; Waichi Kobayashi; Shigeo Okabayashi; Hidefumi Ichinose, all of Ube, Japan

[73] Assignee: Ube Industries, Ltd., Ube, Japan

[21] Appl. No.: 457,683

[22] Filed: Jan. 13, 1983

[30] Foreign Application Priority Data

Jan. 18, 1982 [JP] Japan .................... 57-4940

[51] Int. Cl.$^3$ .............................. C04B 7/35
[52] U.S. Cl. ........................ 106/89; 106/314
[58] Field of Search ............ 106/89, 104, 314

[56] References Cited

U.S. PATENT DOCUMENTS

| | | | |
|---|---|---|---|
| 3,801,339 | 4/1974 | Ogura et al. | 106/314 |
| 3,801,345 | 4/1974 | Nakagawa | 106/314 |
| 3,856,540 | 12/1974 | Mizunuma et al. | 106/314 |

*Primary Examiner*—James Poer
*Attorney, Agent, or Firm*—Armstrong, Nikaido, Marmelstein & Kubovcik

[57] ABSTRACT

An expansive cement additive and a cementitious material added therewith, said expansive additive consisting of a pulverized product of clinker containing 15~60% by weight of free CaO, 5~30% by weight of free $CaF_2$, 30~80% by weight of $11CaO.7Al_2O_3.CaF_2$, and less than 10% by weight of other ingredients or a mixed pulverized product of said clinker and gypsum, in which the weight ratio of $CaSO_4/Al_2O_3$ ranges from 1.0 to 3.5.

11 Claims, No Drawings

EXPANSIVE CEMENT ADDITIVE AND CEMENTITIOUS MATERIAL ADDED THEREWITH

FIELD OF THE INVENTION

This invention relates to an expansive cement additive. An expansive cement additive is a material which can play a role in preventing cracks in hardened cement such as mortar products, concrete products or the like, since, when added to unhydrated cement compositions, its own hydration expansion can compensate the drying shrinkage of the cement compositions being cured. Accordingly, an expansive cement additive requires that the extent and the time of generating hydration expansion should be proper. If the expansion of the expansive cement additive added to an unhydrated cement composition is in excess, cracks will be generated at the time of drying of the hardened cement composition, so that the strength of the hardened cement will remarkably decrease. Whereas, if the expansion is insufficient, the drying shrinkage usually occurring in the hardened cement composition cannot be fully compensated, and as the result the purpose of adding the expansive cement additive can no longer be achieved. Besides the above the indispensable requisites as an expansive cement additive useful in practice should be such that the range of the proper amount of the expansive cement additive added is broad, the effect of compensating the shrinkage of the cement compositions is little affected by the curing temperature as well as the kind of the cement, and so on.

DESCRIPTION OF THE PRIOR ART

Heretofore, as the expansive cement additive there are known lime-gypsum system ($CaO$-$CaSO_4$), calcium sulphoaluminate-lime-gypsum ($3CaO.3Al_2O_3.CaSO_4$-$CaO$-$CaSO_4$) system, etc. The expansive cement additive of the former lime-gypsum system utilizes the expansive action due to the growth of crystals of $Ca(OH)_2$ formed by the hydration of $CaO$. Also, the expansive cement additive of the latter calcium sulphoaluminate-lime-gypsum system utilizes the volume expansion occurring when ettringite ($3CaO.Al_2O_3.CaSO_4.31$~$32H_2O$) is formed by the hydration of $3CaO.3Al_2O_3.CaSO_4$, $CaSO_4$, and $CaO$.

Of the above described prior-known expansive cement additives the expansive cement additive of lime-gypsum system has the general tendency that the hydration expansion rapidly takes place, so that various methods are being considered as the countermeasure for retarding the hydration expansion such as a method in which the crystals of $CaO$ are allowed to be included within the crystals of $3CaO.SiO_2$, a method in which the crystals of $CaO$ are coated with calcium ferrite or gypsum, etc., a method in which a substance capable of retarding the hydration of $CaO$ (e.g., sulphates, etc.) is added, or a method in which it is intended to grow the size of the crystals of $CaO$ by taking advantage of high temperature burning or the like, and others. Nevertheless, the effects of all these methods are not always satisfactory, and the above described various indispensable requisites also can hardly be hoped to the full. On the other hand, with respect to the expansive cement additive of calcium sulphoaluminate-lime-gypsum system also such requisites are never satisfactory.

SUMMARY OF THE INVENTION

It is the primary object of this invention to provide an expansive cement additive which possesses a moderate expansive performance, that is to say, a proper amount of expansion and a proper rate of generating expansion, and moreover, whose expansive performance is little affected either by the amount of said expansive cement additive added or by the kind of the cement as the subject of addition as well as the curing temperature, etc.

The above described object can be achieved by an expansive cement additive of this invention consisting of a pulverized product of clinker which contains 15~60% by weight of free $CaO$, 5~30% by weight of free $CaF_2$, 30~80% by weight of $11CaO.7Al_2O_3.CaF_2$, and less than 10% by weight of other ingredients, or by an expansive cement additive consisting of a mixed pulverized product of clinker having the same composition as the pulverized product of the above described clinker and gypsum, said mixed pulverized product containing $CaSO_4$ and $Al_2O_3$ specifically in a $CaSO_4/Al_2O_3$ ratio within the range of 1.0~3.5 by weight.

DETAILED DESCRIPTION OF THE INVENTION AND PREFERRED EMBODIMENTS

The expansive cement additive of this invention is a pulverized product of clinker having a specified composition or a mixed pulverized product in a specified proportion of said clinker having a specified composition and gypsum.

The above described clinker can be prepared for example, in such a way that powders of the calcareous material such as lime stone, etc., the aluminous material such as alumina for industrial purpose, bauxite, etc., and fluoride material such as fluorite, etc. are incorporated in predetermined amounts, and after having been granulated either by wet process or by dry process as occasion demands, these incorporated materials are subjected to burning in an appropriate burning furnace such as a rotary kiln, etc. The burning temperature in the above case is usually chosen from the range of about 1000°~1400° C., but in order to obtain sintered products of good quality the burning temperature is preferably chosen from the range of about 1100°~1200° C.

The clinker used in this invention is a clinker containing free $CaO$, free $CaF_2$, and $11CaO.7Al_2O_3.CaF_2$ as chief ingredients, and in this clinker the free $CaO$ is present in a dispersed state, the particles of $CaO$ being coated with partially molten free $CaF_2$. In order to obtain the expansive cement additive of this invention each of the chief ingredients should be present in the clinker in a specified proportion.

That is to say, the free $CaO$ should be present in the clinker in an amount ranging from 15 to 60% by weight. In the case where the amount of the free $CaO$ is less than 15% by weight, the amount of expansion of the clinker falls short, so that in order to achieve the desired effect of shrinkage reduction by the addition to the cement composition the amount of the clinker added should be increased. But, if the amount of the clinker added is increased the strength of the hardened cement will inevitably decrease, which undesirably gives rise to a serious problem in practice. Also, if the amount of the free $CaO$ exceeds 60% by weight it becomes very difficult to control the rate of hydration within a proper range even by varying the content of the free $CaF_2$ or the $11CaO.7Al_2O_3.CaF_2$.

The free $CaF_2$ should be present in the clinker in an amount ranging from 5 to 30% by weight. If the amount of the free $CaF_2$ is less than 5% by weight it is undesirable because the rate of hydration of CaO becomes hardly controlable within a proper range. Also, if the amount of the free $CaF_2$ exceeds 30% by weight, in order to obtain such a clinker use must be made of a large amount of fluoride material, and in the case where the incorporated materials containing such a large amount of fluoride material are burned in a kiln or the like, the phenomena such as coating, etc. are liable to occur in the step of burning, so that the stable operation of the kiln becomes difficult.

The content of $11CaO.7Al_2O_3.CaF_2$ should be within the range of 30~80% by weight. If the content falls outside the above described range, the range of the proper amount of the expansive cement additive added becomes narrow, and thus this undesirably brings about a considerable disadvantage in practice.

In addition, the clinker used in this invention may contain the ordinary portland cement clinker compounds (for example, $3CaO.SiO_2$, $4CaO.Al_2O_3.Fe_2O_3$, etc.) or other impurities so long as their total amount is within 10% by weight.

The expansive cement additive of this invention is a pulverized product of clinker having the above described composition, but the Blaine specific surface of the pulverized product is preferably within the range of 1500~4000 $cm^2/g$. And more preferable range of the Blaine specific surface of the pulverized product is about 2000~3000 $cm^2/g$.

The clinker having the above described composition can be used as an expansive cement additive even when it is a single pulverized product as above, but it can also be used for the same purpose as a mixed pulverized product with gypsum. By the term "a mixed pulverized product" as used herein are meant both of a pulverized product which was obtained by pulverization after mixing the clinker with gypsum and a pulverized product which was obtained by mixing both of the separately beforehand pulverized clinker and gypsum. But in order to obtain an effective expansive cement additive it is preferable that the weight ratio of $CaSO_4/Al_2O_3$ in the mixed pulverized product of clinker and gypsum is within the range of 1.0~3.5. The expansive cement additive in which the weight ratio of $CaSO_4/Al_2O_3$ is within the above described range has not only the stable effect of shrinkage reduction for cement but also a much broadened range in the proper amount added. As to the gypsum used for the above described purpose there is no particular limitation, so that various forms of gypsum can be used, but the use of anhydrous gypsum II is the most preferable.

In practice, the drying shrinkage of paste, mortar, concrete, etc. produced from a cementitious material can be reduced for the prevention of cracks by adding the cement expansive additive of this invention consisting only of clinker in the amount of 1~14%, preferably 5~11%, on the basis of internally divided weight ratio to cement, or the cement expansive additive consisting of clinker and gypsum in the amount of 1~20%, preferably 5~15%, on the same basis.

The expansive cement additive of this invention, which is of the above described constitution, can give an excellent effect of shrinkage reduction on cement compositions as compared with the expansive cement additives heretofore commonly used or the expansive cement additives proposed in various kinds of literature.

Further, since the expansive cement additive of this invention has a broad range in the proper amount added to cement compositions, it is considerably advantageous in the aspect of operability, and moreover, on account of the fact that it is little affected by the kind of the cement as the subject of addition as well as by the hardening conditions such as curing temperature, etc., there is no need for particular consideration even under various working conditions of cement, and this is especially advantageous in practice. Furthermore, since the expansive cement additive of this invention can be manufactured by burning at a temperature as low as about 1100°~1200° C. as above described, it is obviously advantageous in its manufacture also.

Now, in order to explain this invention more fully examples and comparative examples will be given below.

EXAMPLES 1~2, COMPARATIVE EXAMPLES 1~2

By adding various kinds of expansive cement additives to ordinary cement in an amount of 10% by weight drying shrinkage tests in mortar were carried out. The testing method was employed inconformity with the standard testing method of the Japanese Cement Association CAJS H-11-1975 "Testing Method for Measurement of Variation in Length due to Drying of Mortar". In the above described method, however, the demold was carried out after a 24-hr curing in moist cabinet, and immediately thereafter lines were ruled to provide a basal length. Also, as for the subsequent curing, after a 6-day curing in water (20° C.), each sample was cured normally in a constant temperature and humidity room at 20° C. and RH 50%, and the length was measured after the lapse of a predetermined curing period. In addition, in the following description "%" represents "% by weight" unless otherwise specified, and also, the amount of the expansive cement additive is on the basis of internally divided weight ratio.

(1) Expansive cement additive A—Example 1

Use was made of a clinker having the following composition.

| | |
|---|---|
| Free CaO | 43% |
| Free $CaF_2$ | 13% |
| $11CaO.7Al_2O_3.CaF_2$ | 40% |
| Fineness | 2500 $cm^2/g$ |

(Chemical composition of the above described clinker: ignition loss 0.2%, insoluble residue 0.1%, $SiO_2$ 1.3%, $Al_2O_3$ 20.5%, $Fe_2O_3$ 0.2%, CaO 70.7%, MgO 0.3%, $SO_3$ 0.0%, F 7.6%)

(2) Expansive cement additive B—Example 2

Expansive cement additive B (fineness: 2500 $cm^2/g$) was prepared by mixing the clinker used in Example 1 with gypsum (anhydrous gypsum II) having the following composition so that the weight ratio of $CaSO_4/Al_2O_3$ in the resulting mixture may be 3.0).

Chemical composition of the above described gypsum: ignition loss 0.1%, insoluble residue+$SiO_2$ 0.1%, $Al_2O_3$+$Fe_2O_3$ 0.3%, CaO 41.0%, MgO 0.3%, $SO_3$ 56.9%.

(3) Expansive cement additive a—Comparative Example 1

Use was made of a commercially available expansive cement additive of calcium sulphoaluminate-lime-gypsum system.

(4) Expansive cement additive b—Comparative Example 2

Use was made of a commercially available expansive cement additive of lime-gypsum system.

Table 1 indicates the results of the drying shrinkage tests which were carried out with respect to 15 kinds of ordinary portland cement obtained from different sources using the above described expansive cement additives.

TABLE 1

| Expansive cement additive | Range of rate of variation in length ($\times 10^{-4}$) | | |
|---|---|---|---|
| | Curing period 1 week | Curing period 4 weeks | Curing period 13 weeks |
| A | 7.2~18.1 | 3.6~9.3 | −1.2~5.7 |
| B | 8.8~19.5 | 4.8~11.5 | −0.9~6.3 |
| a | 16.8~42.3 | 4.3~30.6 | −1.5~11.3 |
| b | 2.9~4.9 | −5.9~−9.1 | −10.5~−12.3 |

EXAMPLES 3~4, COMPARATIVE EXAMPLES 3~4

Drying shrinkage tests were carried out by varying the curing temperature with respect to expansive cement additives A~B and a~b used in Examples 1~2 and Comparative Examples 1~2. The curing temperature was varied in three stages of 5° C., 20° C., and 30° C. In addition, the amount of the expansive cement additives added, the testing method of drying shrinkage, etc. were all the same as those in Example 1.

TABLE 2

| Expansive cement additive | Range of rate of variation in length ($\times 10^{-4}$) | | |
|---|---|---|---|
| | Curing period 1 week | Curing period 4 weeks | Curing period 13 weeks |
| A | 7.4~15.9 | 3.7~9.3 | −2.1~2.9 |
| B | 8.1~16.6 | 5.4~12.1 | −0.9~3.4 |
| a | 13.5~39.5 | 5.7~24.2 | −3.1~18.8 |
| b | 2.3~5.1 | −4.0~−8.2 | −10.2~−12.9 |

EXAMPLES 5~7, COMPARATIVE EXAMPLES 5~9

Drying shrinkage tests were carried out in the same manner as in Example 1 except that use was made of one kind of commercially available ordinary portland cement and several expansive cement additives consisting of clinker having different composition (each having fineness of 2500 cm²/g). The compositions of the expansive cement additives used are shown in Table 3. For comparison a similar test was carried out in the case where no expansive cement additive was added. Table 4 shows the results of all these tests.

TABLE 3

| | Expansive cement additive | Composition of clinker (%) | | | |
|---|---|---|---|---|---|
| | | Free CaO | Free CaF$_2$ | 11CaO.7Al$_2$O$_3$.CaF$_2$ | Others |
| Example | | | | | |
| 5 | C | 25 | 8 | 63 | 4 |
| 6 | D | 43 | 13 | 40 | 4 |
| 7 | E | 52 | 14 | 33 | 1 |
| Comparative example | | | | | |
| 5 | c | 9 | 15 | 71 | 5 |
| 6 | d | 46 | 2 | 49 | 3 |
| 7 | e | 74 | 6 | 19 | 1 |
| 8 | f | 11 | 2 | 87 | 0 |
| 9 | g | | | no addition | |

TABLE 4

| Expansive cement additive | Rate of variation in length ($\times 10^{-4}$) | | |
|---|---|---|---|
| | Curing period 1 week | Curing period 4 weeks | Curing period 13 weeks |
| C | 7.6 | 0.2 | −1.5 |
| D | 15.6 | 5.1 | −0.2 |
| E | 23.3 | 7.9 | 3.6 |
| c | 4.6 | −5.3 | −8.5 |
| d | 3.9 | −6.1 | −9.9 |
| e | cracks due to expansion | | |
| f | 4.2 | −7.3 | −10.3 |
| g | 2.5 | −9.2 | −13.5 |

EXAMPLES 8~11

Drying shrinkage tests were carried out in the same manner as in Example 1 using one kind of commercially available ordinary portland cement and several expansive cement additives consisting of clinker having different fineness. The expansive cement additives used were the same as that used in Example 6 except that the fineness was varied. The Blaine specific surface of the expansive cement additives used is as follows.

| Example | Expansive cement additive | Blaine specific surface (cm²/g) |
|---|---|---|
| 8 | F | 1500 |
| 9 | D | 2500 |
| 10 | G | 4000 |
| 11 | H | 6000 |

The results obtained are shown in Table 5

TABLE 5

| Expansive cement additive | Rate of variation in length ($\times 10^{-4}$) | | |
|---|---|---|---|
| | Curing period 1 week | Curing period 4 weeks | Curing period 13 weeks |
| F | 20.1 | 7.2 | 1.5 |
| D | 15.6 | 5.1 | −0.2 |
| G | 13.9 | 2.9 | −2.0 |
| H | 9.3 | 1.3 | −5.3 |

Note
Example 9 is the same as Example 6.

EXAMPLES 12~15, REFERENCE EXAMPLE, COMPARATIVE EXAMPLES 10~12

For the purpose of investigating the range of the proper amount of the expansive cement additive added drying shrinkage tests were carried out in the same manner as in Example 1, in which case an expansive cement additive consisting of a clinker alone (expansive cement additive D in Example 6 was used—Examples 12 and 13, and Reference Example) and an expansive cement additive consisting of a mixture of clinker and gypsum (a mixture of expansive cement additive D in Example 6 and gypsum used in Example 2: weight ratio of $CaSO_4/Al_2O_3$ in the mixture 3.18—Examples 14~16) were used varying the amount added to one kind of commercially available ordinary portland cement. Also, for comparison there was carried out a drying shrinkage test the same as Example 1 with respect to an expansive cement additive consisting of only the clinker used in Comparative Example 6, varying the amount added to the above described ordinary portland cement (Comparative Examples 10~12).

The results obtained are shown in Table 6.

TABLE 6

|  | (Amount added) | Rate of variation in length ($\times 10^{-4}$) | | |
|---|---|---|---|---|
|  |  | Curing period 1 week | Curing period 4 weeks | Curing period 13 weeks |
| Example |  |  |  |  |
| 12 | 5% | 4.1 | −3.9 | −6.3 |
| 13 | 10% | 15.6 | 5.1 | −0.2 |
| * | 15% | Cracks due to expansion | | |
| 14 | 5% | 5.2 | −3.0 | −3.9 |
| 15 | 10% | 16.1 | 8.2 | 2.2 |
| 16 | 15% | 30.4 | 14.5 | 6.2 |
| Comparative Example |  |  |  |  |
| 10 | 5% | 3.0 | −8.6 | −10.2 |
| 11 | 10% | 3.9 | −6.1 | −9.9 |
| 12 | 15% | 4.1 | −5.7 | −8.5 |

Note
In the above table "amount added" means the amount of the expansive cement additive added. Also, the mark * is Reference Example. In addition, Example 13 and Comparative Example 11 are respectively the same as the foregoing Example 6 and Comparative Example 6.

EXAMPLES 17~18, COMPARATIVE EXAMPLES 13~15

Expansive cement additives consisting of a mixture of clinker and gypsum (mixtures of expansive cement additive D in Example 6 and gypsum used in Example 2) were prepared varying the weight ratio of $CaSO_4/Al_2O_3$ in the mixture, and by adding said additives in an amount of 15% to a commercially available ordinary portland cement drying shrinkage tests were carried out in the same manner as Example 1.

The results obtained are shown in Table 7.

TABLE 7

|  | (Weight ratio) | Rate of variation in length ($\times 10^{-4}$) | | |
|---|---|---|---|---|
|  |  | Curing period 1 week | Curing period 4 weeks | Curing period 13 weeks |
| Example |  |  |  |  |
| 17 | 1.2 | 14.1 | 6.3 | 1.3 |
| 18 | 3.5 | 31.2 | 14.8 | 5.2 |
| Comparative Example |  |  |  |  |
| 13 | 0.5 | Cracks due to expansion | | |

TABLE 7-continued

|  | (Weight ratio) | Rate of variation in length ($\times 10^{-4}$) | | |
|---|---|---|---|---|
|  |  | Curing period 1 week | Curing period 4 weeks | Curing period 13 weeks |
| 14 | 4 | 5.1 | −4.6 | −9.0 |
| 15 | 41 | 4.0 | −8.2 | −10.9 |

Note
"weight ratio" means the weight ratio of $CaSO_4/Al_2O_3$ in the expansive cement additives.

What is claimed is:

1. An expansive cement additive consisting of a pulverized product of clinker containing 15~60% by weight of free CaO, 5~30% by weight of free $CaF_2$, 30~80% by weight of $11CaO.7Al_2O_3.CaF_2$, and less than 10% by weight of other ingredients.

2. An expansive cement additive consisting of a mixed pulverized product of clinker containing 15~60% by weight of free CaO, 5~30% by weight of free $CaF_2$, 30~80% by weight of $11CaO.7Al_2O_3.CaF_2$, and less than 10% by weight of other ingredients with gypsum, in which the weight ratio of $CaSO_4/Al_2O_3$ ranges from 1.0 to 3.5.

3. An expansive cement additive as defined in claim 1 or 2, wherein said clinker is prepared by burning at a burning temperature of about 1000°~1400° C.

4. An expansive cement additive as defined in claim 1 or 2, wherein said clinker is prepared by burning at a burning temperature of about 1100°~1200° C.

5. An expansive cement additive as defined in claim 1 or 2, wherein the Blaine specific surface of said pulverized product of clinker is about 1500~4000 cm$^2$/g.

6. An expansive cement additive as defined in claim 1 or 2, wherein the Blaine specific surface of said pulverized product of clinker is about 2000~3000 cm$^2$/g.

7. An expansive cement additive as defined in claim 2, wherein said gypsum is anhydrous gypsum II.

8. A cementitious material added with an expansive cement additive consisting of a pulverized product of clinker containing 15~60% by weight of free CaO, 5~30% by weight of free $CaF_2$, 30~80% by weight of $11CaO.7Al_2O_3.CaF_2$, and less than 10% by weight of other ingredients in the amount of 1~14% on the basis of internally divided weight ratio to cement.

9. A cementitious material as defined in claim 8, wherein the expansive cement additive is added in the amount of 5~11%.

10. A cementitious material added with an expansive cement additive consisting of a mixed pulverized product of clinker containing 15~60% by weight of free CaO, 5~30% by weight of free $CaF_2$, 30~80% by weight of $11CaO.7Al_2O_3.CaF_2$, and less than 10% by weight of other ingredients with gypsum, in which the weight ratio of $CaSO_4/Al_2O_3$ ranges from 1.0 to 3.5, in the amount of 1~20% on the basis of internally divided weight ratio to cement.

11. A cementitious material as defined in claim 10, wherein the expansive cement additive is added in the amount of 5~15%.

* * * * *